United States Patent
Sasaki

(10) Patent No.: US 8,321,737 B2
(45) Date of Patent: Nov. 27, 2012

(54) DATA TRANSFER APPARATUS AND DATA TRANSFER CONTROL METHOD

(75) Inventor: Takatsugu Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 12/412,798

(22) Filed: Mar. 27, 2009

(65) Prior Publication Data

US 2009/0249154 A1 Oct. 1, 2009

(30) Foreign Application Priority Data

May 30, 2008 (JP) ................................. 2008-142651

(51) Int. Cl.
*G01R 31/28* (2006.01)
*G08C 25/02* (2006.01)
*H03M 13/00* (2006.01)

(52) U.S. Cl. ..................... 714/748; 714/712; 714/751

(58) Field of Classification Search .................. None
See application file for complete search history.

(56) References Cited

U.S. PATENT DOCUMENTS

| | | | | |
|---|---|---|---|---|
| 3,868,633 A | * | 2/1975 | Nuese ............................ | 714/750 |
| 5,025,444 A | * | 6/1991 | Clayton et al. ................ | 714/750 |
| 5,163,055 A | * | 11/1992 | Lee et al. ....................... | 714/748 |
| 6,161,207 A | * | 12/2000 | Lockhart et al. .............. | 714/758 |
| 6,912,686 B1 | * | 6/2005 | Rodriguez et al. ............ | 714/799 |
| 6,938,195 B1 | | 8/2005 | Shi et al. | |
| 7,600,173 B2 | * | 10/2009 | Matsumoto .................... | 714/755 |
| 8,010,862 B2 | * | 8/2011 | Setton et al. .................. | 714/750 |
| 8,074,138 B2 | * | 12/2011 | Chae et al. ..................... | 714/748 |
| 2005/0210355 A1 | * | 9/2005 | Itoh et al. ....................... | 714/748 |
| 2006/0064627 A1 | * | 3/2006 | Berens et al. ................. | 714/790 |
| 2007/0022362 A1 | * | 1/2007 | Yue et al. ....................... | 714/790 |

FOREIGN PATENT DOCUMENTS

| | | |
|---|---|---|
| JP | 63-318838 | 12/1988 |
| JP | 64-834 | 1/1989 |
| JP | 03-158960 | 7/1991 |
| JP | 2000-349742 | 12/2000 |

OTHER PUBLICATIONS

Japanese Office Action mailed Aug. 7, 2012 for corresponding Japanese Application No. 2008-142651, with partial English-language translation.

* cited by examiner

*Primary Examiner* — John Trimmings
*Assistant Examiner* — Daniel McMahon
(74) *Attorney, Agent, or Firm* — Fujitsu Patent Center

(57) ABSTRACT

A data transfer apparatus in which, in a failure state such that an error packet is received at a reception end, the error packet is returned and is recorded in the transmission end, the error packet is analyzed and an error bit is identified at the transmission end, and data transmission/reception units are initialized and restarted in order to recover from the failure state.

7 Claims, 14 Drawing Sheets

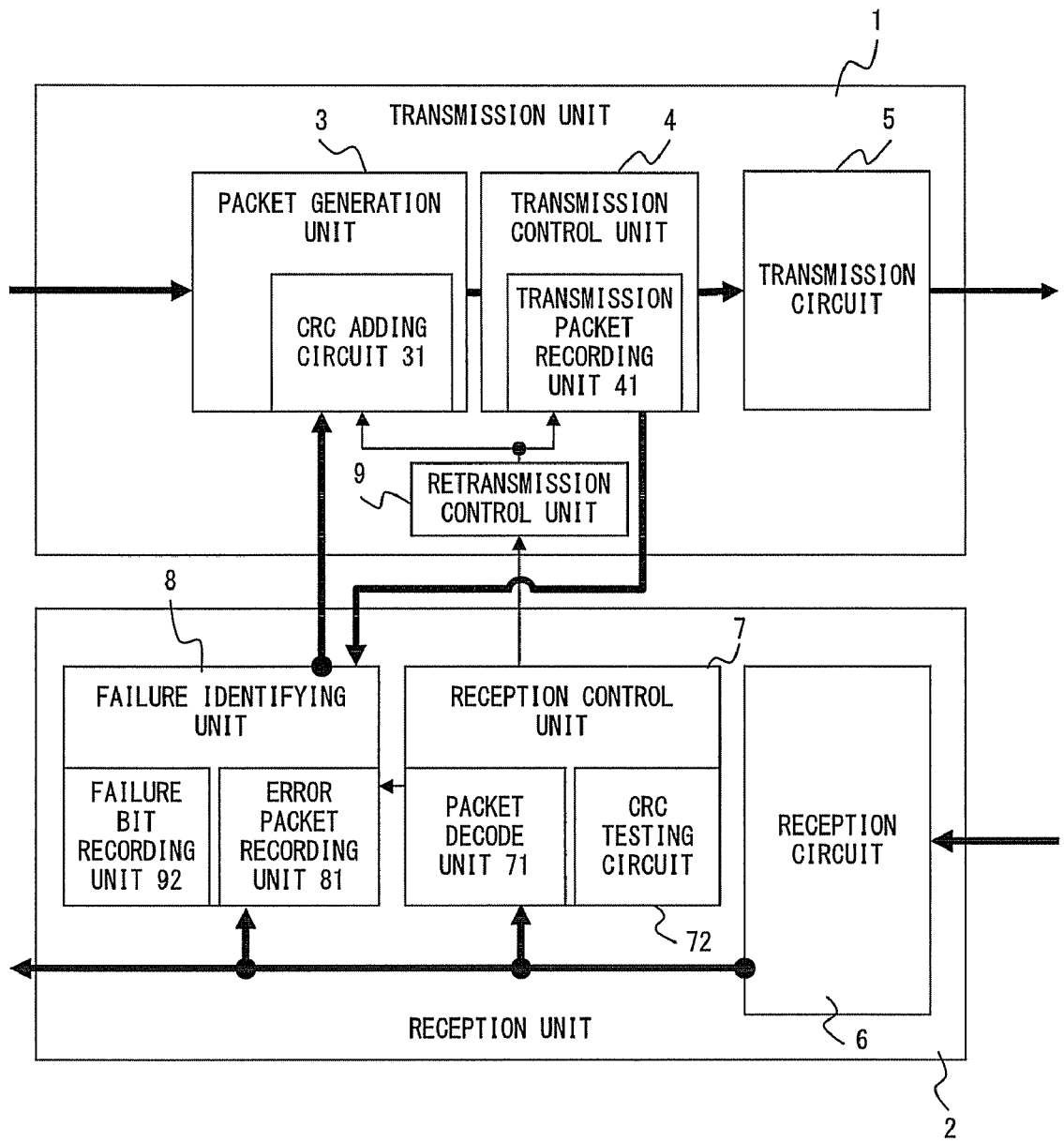
F I G. 4

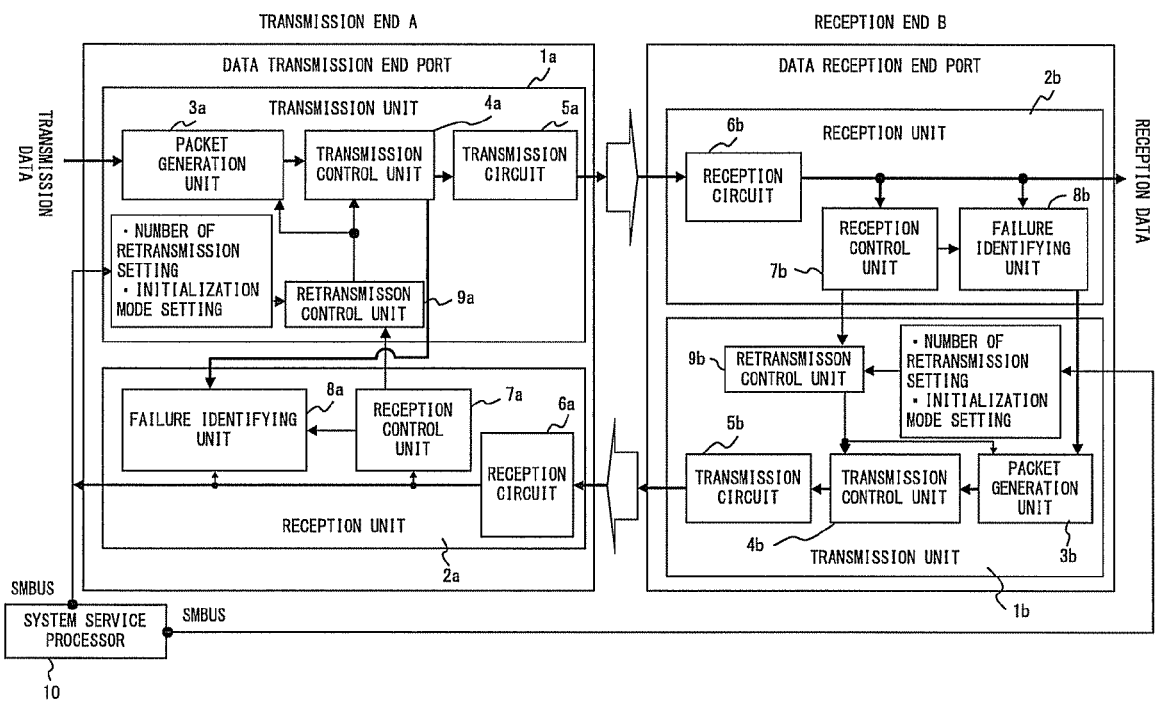
F I G. 5A

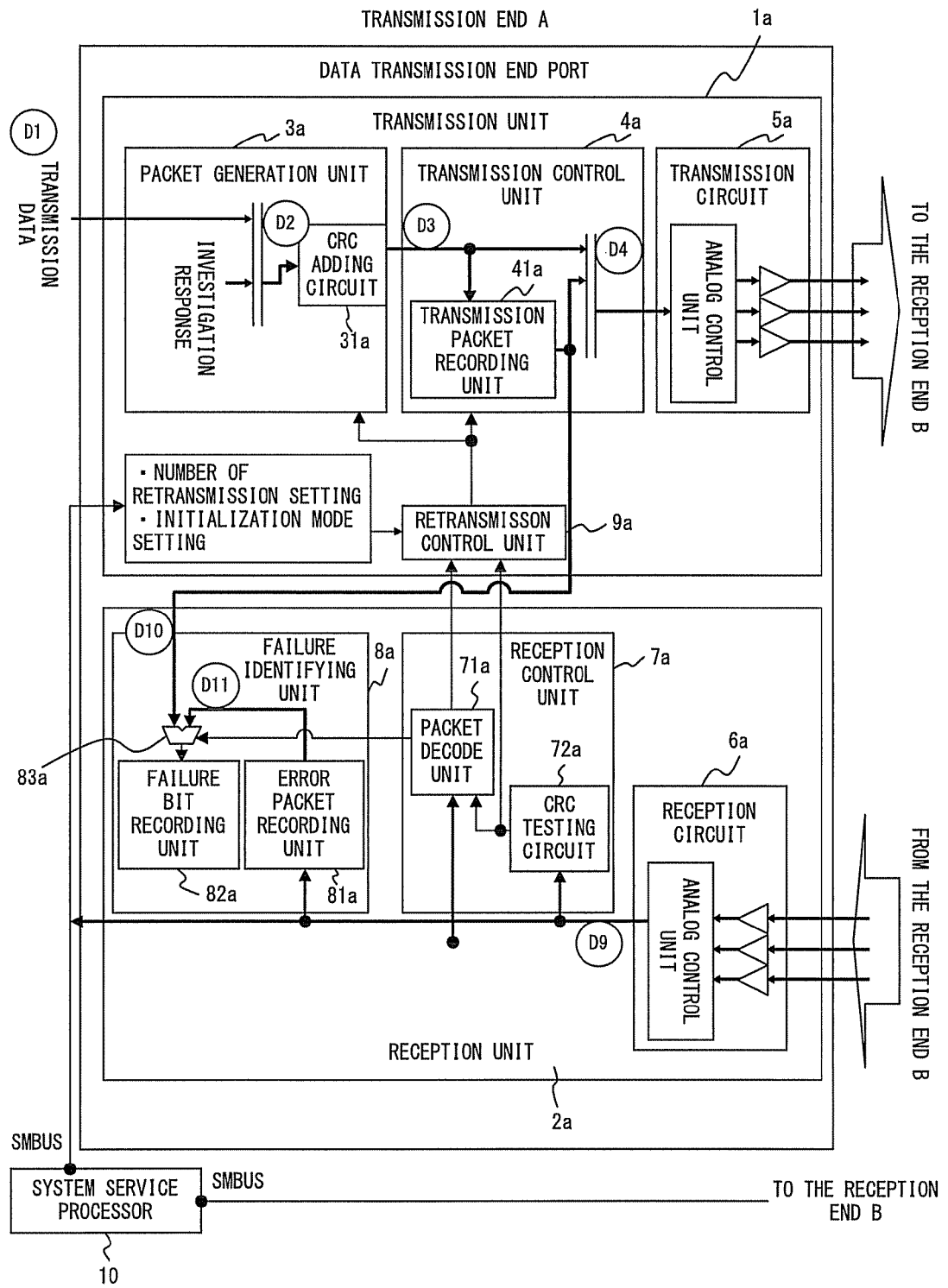
F I G. 5B

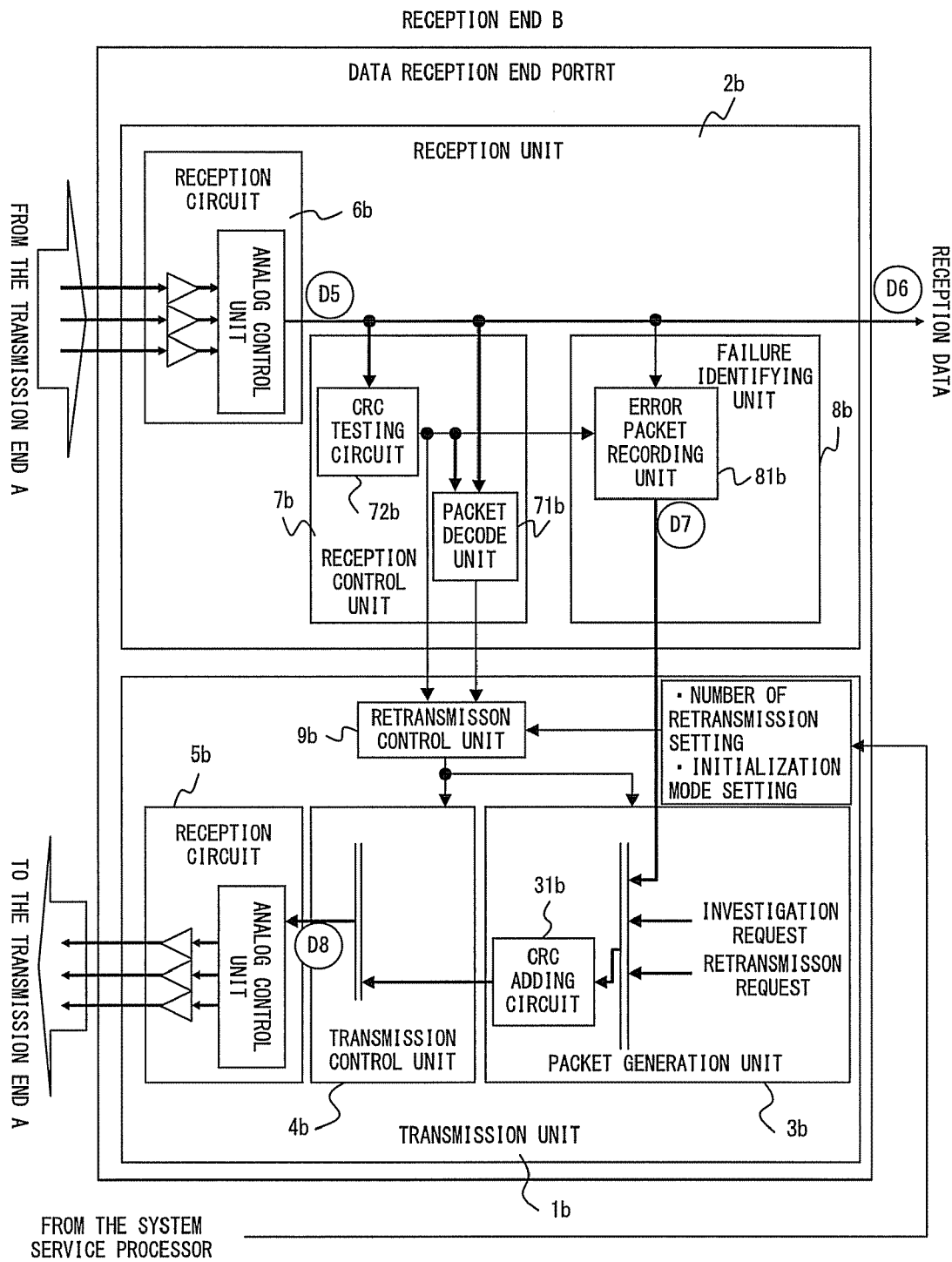
F I G. 5C

PACKET FORMAT
| HEADER | DATA | CRC | ← 1cycle |
⸲
| DATA | CRC | ← 2~8cycle |
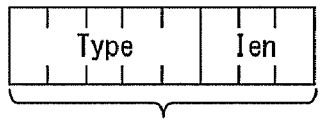
HEADER
| Type | TYPE |
|---|---|
| 00000 | NORMAL PACKET |
| 10*** | RETRANSMISSION REQUEST |
| 01*** | RETRANSMISSION RESPONSE (ACKNOWLEDGE) |
| 0010* | INVESTIGATION REQUEST |
| 0001* | INVESTIGATION RESPONSE (ACKNOWLEDGE) |
| 00001 | ERROR INVESTIGATION PACKET |
| len | TYPE |
|---|---|
| 000 | 1cycle |
| ⸲ | ⸲ |
| 111 | 8cycle |
F I G. 6

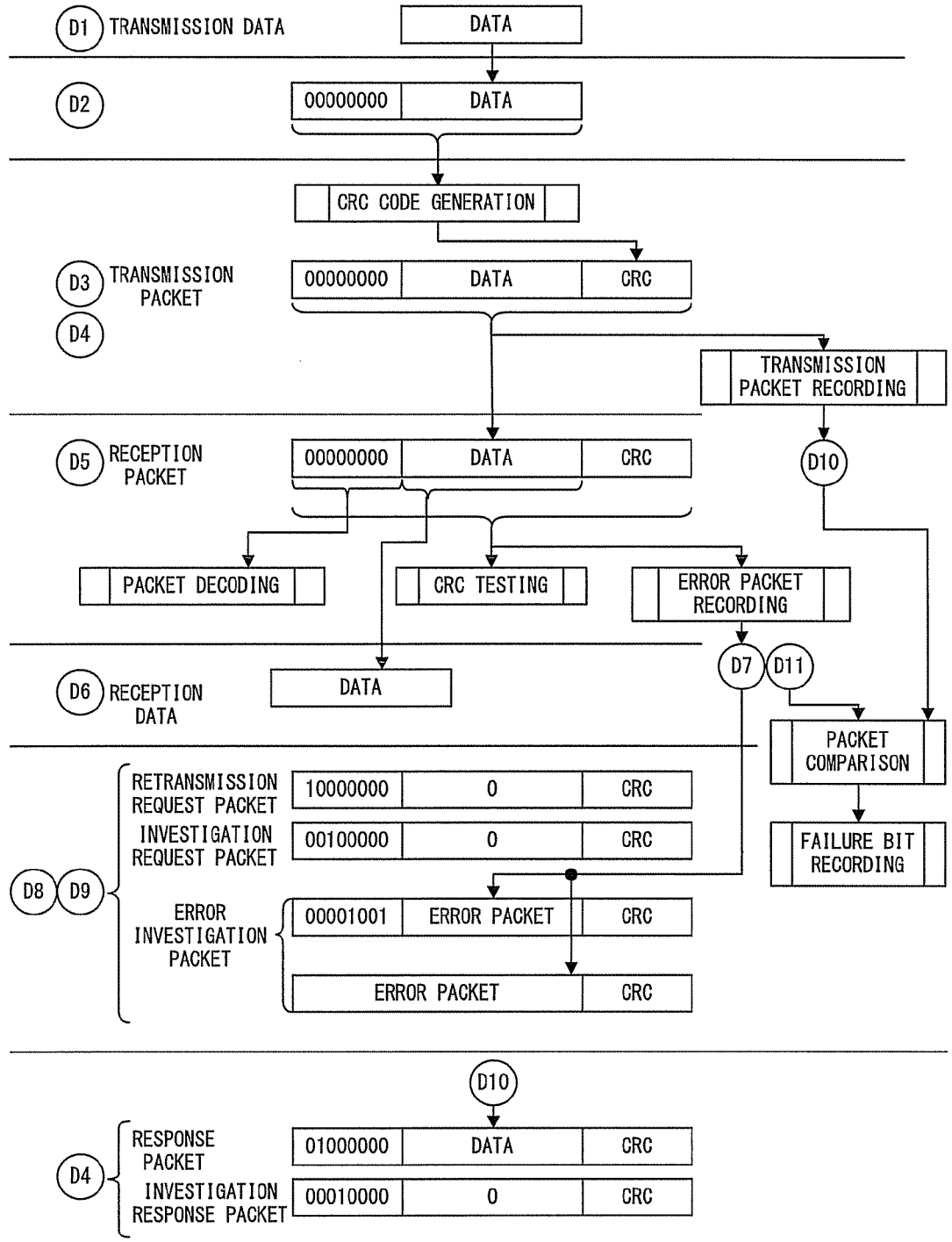
F I G. 7

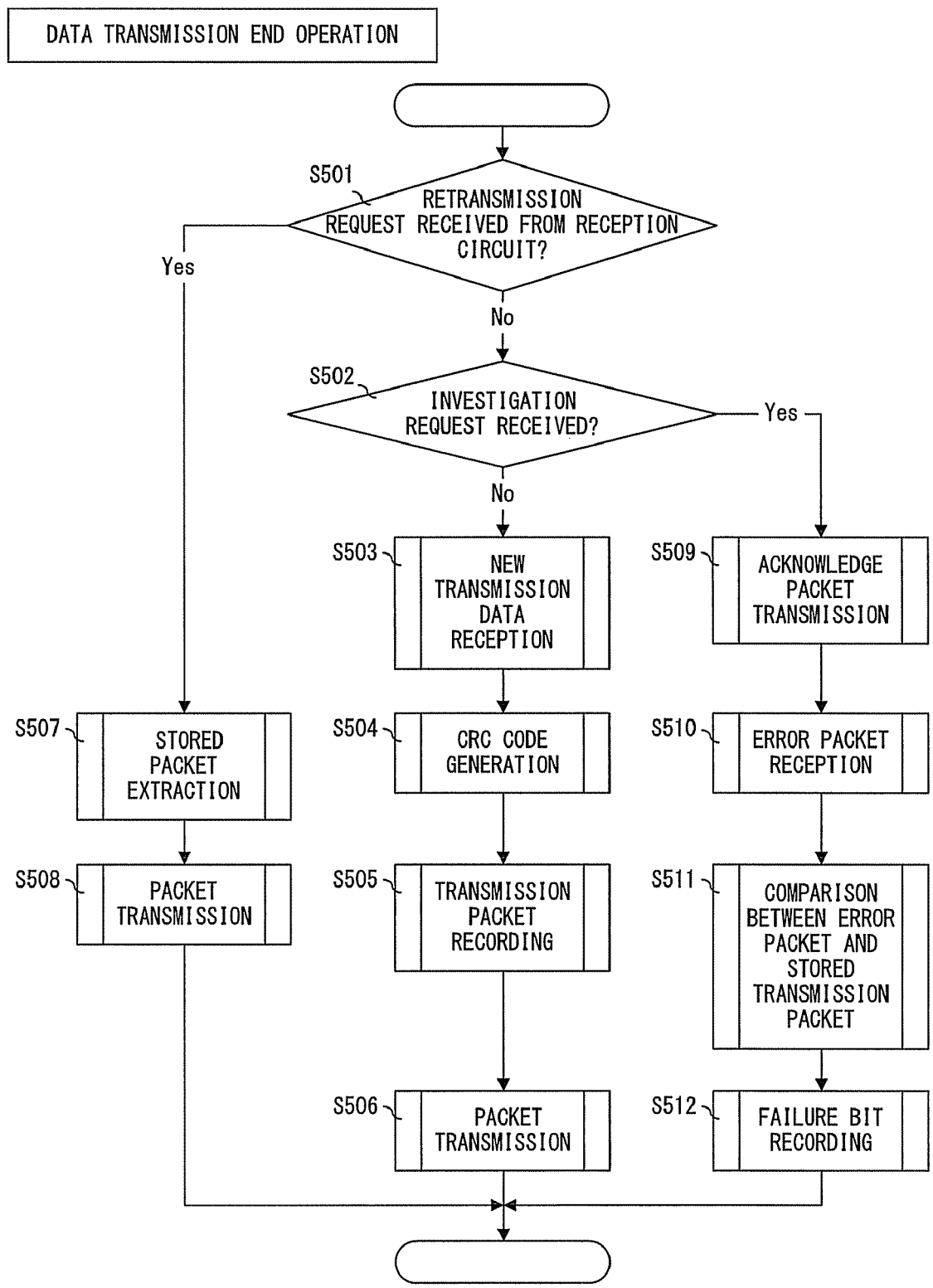
F I G. 8

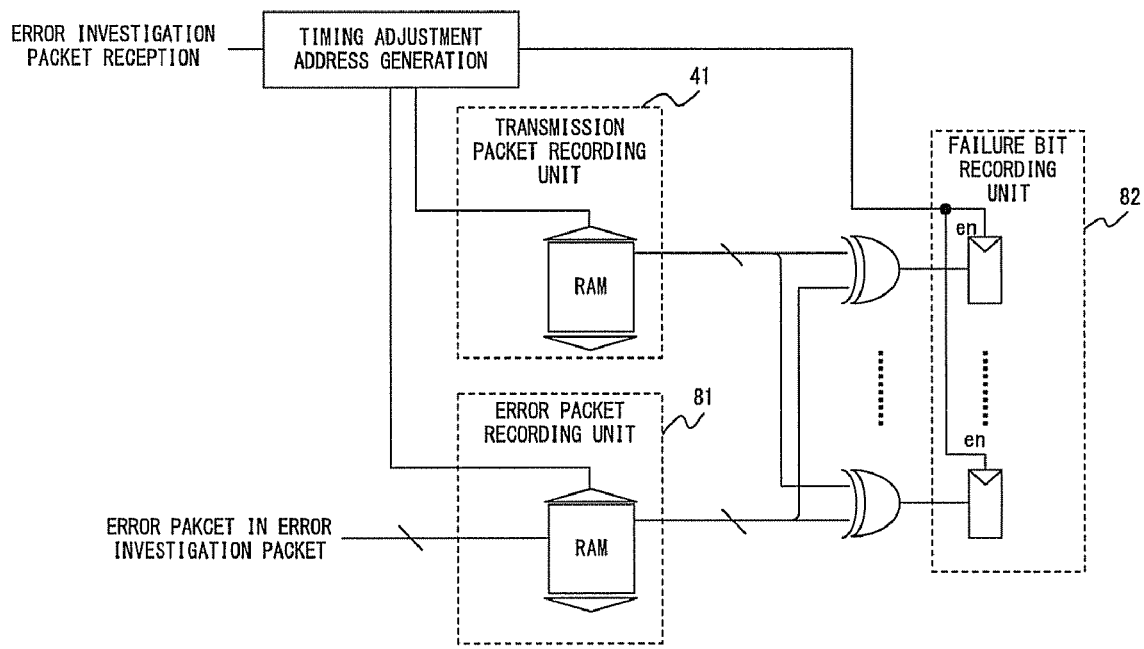
F I G. 9

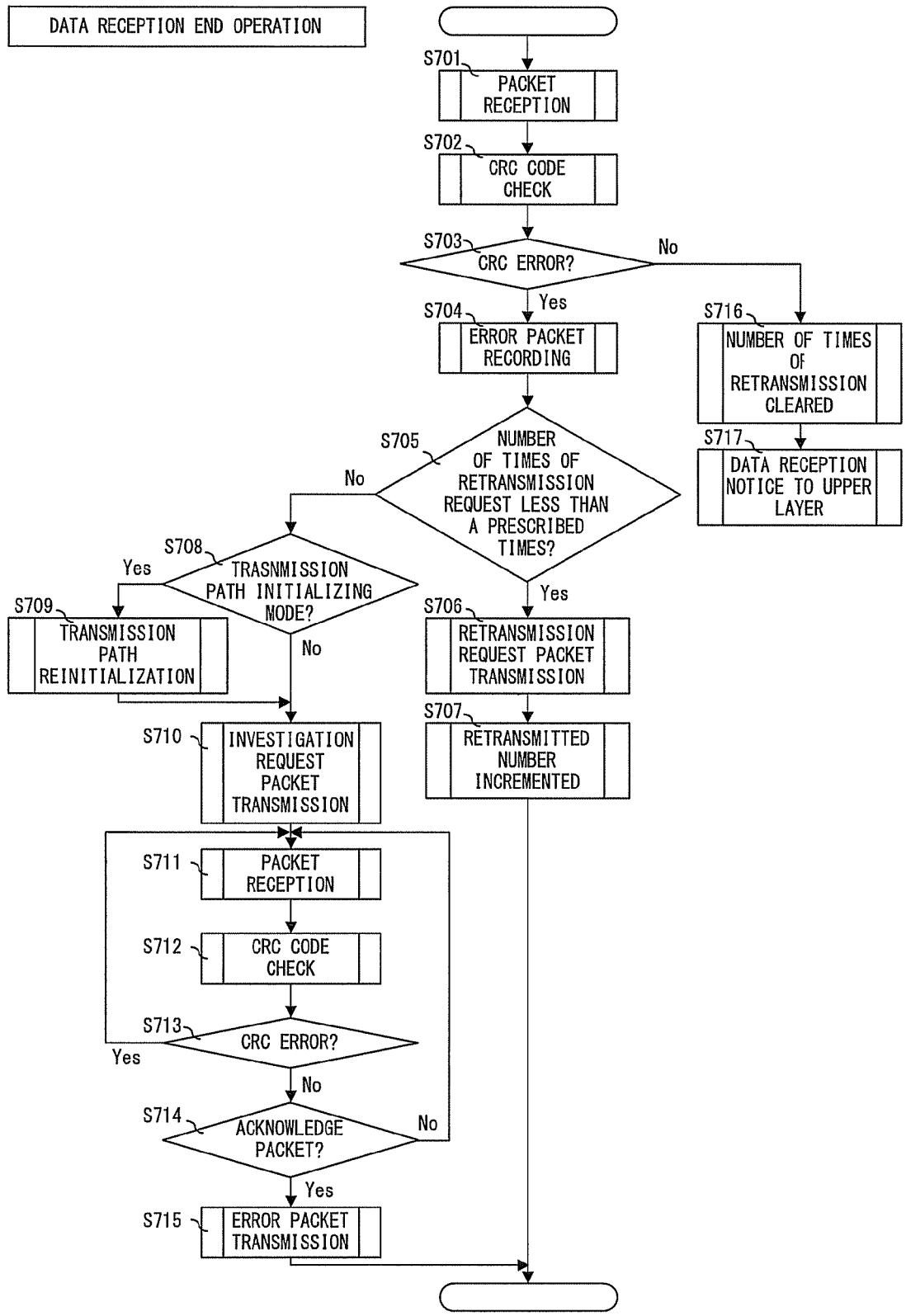
F I G. 10

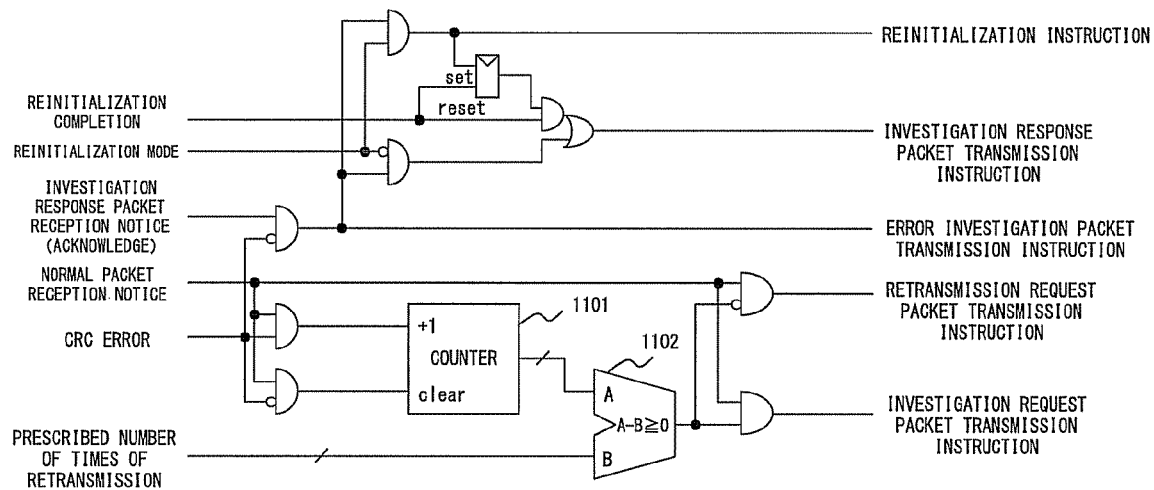
F I G. 1 1

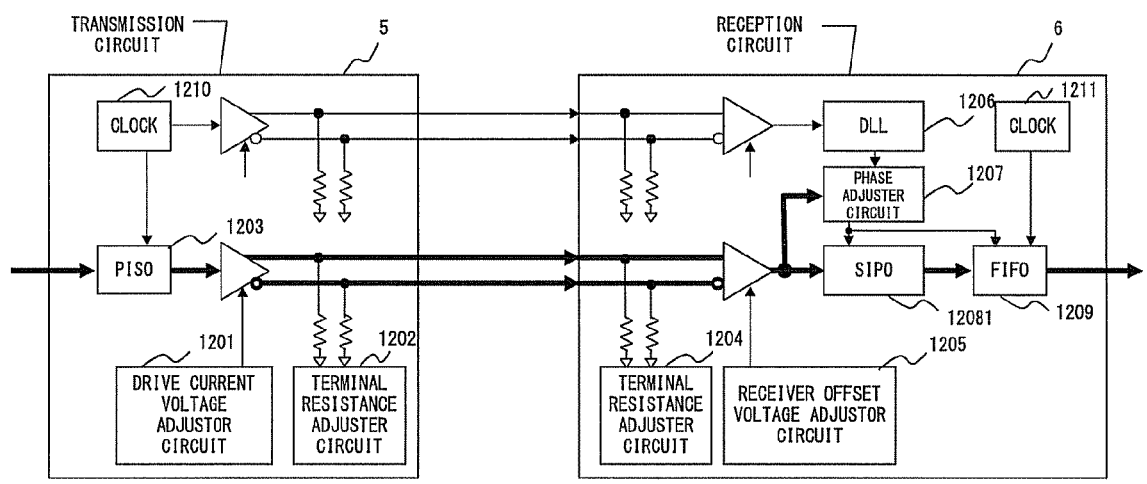
F I G. 1 2

DATA TRANSFER APPARATUS AND DATA TRANSFER CONTROL METHOD

CROSS-REFERENCE TO RELATED APPLICATION

This application is based upon and claims the benefit of priority of the prior Japanese Patent Application No. 2008-142651, filed on May 30, 2008, the entire contents of which are incorporated herein by reference.

FIELD

The embodiment relates to a data transfer apparatus for transmitting/receiving data, and a control method thereof.

BACKGROUND

Various data transfer apparatuses and data transfer methods have been proposed to realize highly reliable and highly efficient communications in transmission paths where errors such as inversion of any bit 0 or 1 in data transferred from a transmission end to a reception end may occur due to a soft error. Here, the soft error is defined as an error caused by an alpha ray from outer space (helium nuclear ray). A typical example of data transfer apparatuses is one with a constitution that allows for transmission of transmission data that is added with error testing information such as CRC (Cyclic Redundancy Check), which is an error detectable code, from a transmission end to a reception end.

The following disclosed data transfer method was made to realize the objects of reducing data transfer time that increases when the error testing information is transmitted and of creating a constitution that does not require an error testing circuit in the reception end. A transmission end stores communication data at the same time as transmitting the data to a reception end, and the reception end receives the data transmitted from the transmission end and returns the data back to transmission end. The transmission end compares the returned data with the stored data, and if the data do not match, the data is retransmitted.

The following disclosed data transfer method was made to prevent increase in time for completing transmission that would occur under such a circumstance that after transmitting data, the transmission end cannot transmit the next data until an error detection result is returned from the reception end. The data transmission method is such that data added with a correction code is transmitted, and if data received in the reception end has an error, the received data is corrected on the basis of the correction code. The corrected data and the correction code are returned to the transmission end, and the transmission end compares the originally transmitted data with the corrected data. If an error is detected, the transmission data is retransmitted.

Various data transfer apparatuses and methods as described above are suggested. Detailed explanation of a common data transfer information processing apparatus is provided below.

FIG. 1 illustrates a configuration of an information processing apparatus. The information processing apparatus have a processor 101, a crossbar/system control 102, an I/O device 103, memory 104, and a system service processor 105. The processor 101, the crossbar/system control 102, and the I/O device receive an input of control signals from the system service processor 105. Data transfer is mainly performed between the processor 101 and the crossbar/system control 102, and between the crossbar/system control 102 and the I/O device 103. Details of the data transfer sections are enlarged in FIG. 2.

Each of the processor 101, the crossbar/system control 102 and the I/O device 103 has a transmission unit 111 and a reception unit 112 for data transfer.

The processor 101 includes a processor core 113, which serves as a processing unit, and also includes a memory controller 114 for controlling the memory 104. There is another possible constitution such that the processor 101 does not include the memory controller 114 but the processor 101 accesses the memory via external memory controller.

The crossbar/system control 102 includes a switch 116 for dynamically switches a path to transfer data. The I/O device 103 includes an I/O core 117 for control processing of the I/O device.

The data transferred between the processor 101 and the crossbar/system control 102 and between the crossbar/system control 102 and the I/O device 103 has a data width of at least several tens of bits (e.g. 80 bits) or larger, and because the transmission path for transferring such data has multiple-bit parallel wiring, data transfer may be varied and errors such as bit inversion may be caused in data received in the reception end. The errors such as bit inversion in data may be sometimes caused by electrical noise or a reflection wave, which is generated in the transmission path at the time of transmitting data through the transmission path. A bit that is detected as an error in data received at the reception end is referred to as an error bit.

FIG. 3 depicts further detailed configuration of the sections of the transmission unit 111 and the reception unit 112 in FIG. 2. FIG. 3 illustrates a pair of the transmission unit 111 and the reception unit 112 provided in each of the processor 101, the crossbar-system control 102, and the I/O device 103, and performs error-detectable data transfer by using CRC. Note that although CRC is used in this example, other error testing information such as parity can be also used.

The transmission unit 111 has a packet generation unit 121 for generating packets from transmission data consisting of commands and data generated in the upper layer such as the processor core 113, the switch 116 and the I/O core 117, a transmission control unit 122 for executing transmission control of the generated packets, and a transmission circuit 123 for driving the transmission path. The packet generation unit 121 has a CRC adding circuit 125 for adding error testing information such as CRC to transmission data. The transmission control unit 122 has a transmission packet recording unit 126 for recording all transmitted packets in preparation of receiving a request for retransmission from the reception end.

The reception unit 112 has a reception circuit 128 for converting the received voltage waveform into a digital signal (0 or 1) and a reception control unit 127 for checking the received packets. The reception control unit 127 has a packet decode unit 129 for decoding the received packets and a CRC testing circuit 130 for CRC testing of the received packets. When packets received in the packet decode unit 129 are a retransmission request as a result of decoding of the packets, the retransmission control unit 124 is notified of the request, and the retransmission control unit 124 takes a control to retransmit the transmitted packets from the transmission packet recording unit 126. When a fact that received packets has an error is found as a result of the test in the CRC testing circuit 130, the retransmission control unit 124 transmits a retransmission request.

Operations for data transmission/reception illustrated in FIG. 3 are explained below.

The transmission unit 111 at the transmission end generates transmission packets by adding CRC to the transmission data in the packet generation unit 121.

The reception unit 112 at the reception end decodes the received packets in the packet decode unit 129, and conducts CRC testing in the CRC testing circuit 130. The retransmission control unit 124, when notified of the test result of error packets from the CRC testing circuit 130, transmits a retransmission request. If correct packets cannot be received even after making a predetermined number of the retransmission requests, the retransmission control unit 124 stops the transmission of the retransmission requests, and notifies the upper layer such as the processor core 113, the switch 116, and the I/O core 117.

The reception unit 112 at the transmission end decodes the received packets in the packet decode unit 129, and conducts CRC testing in the CRC testing circuit 130. The retransmission control unit 124, when notified of the reception of a retransmission request from the packet decode unit 129, transmits transmitted packets recorded in the transmission packet recording unit 126. Afterwards, upon receiving an acknowledgement to inform the normal reception of the packets from the reception end, the transmission end resumes the normal packet transmission operations.

CRC does not have an error correction function and cannot specify an error bit. For that reason, in common communication systems using CRC, a reception end discards data when an error is detected and requests the transmission end retransmission of the transmitted data. In the past, it was common technology that when an error is detected in received data, i.e. packets, the reception end discards the error packets and requests retransmission of the data.

Errors (mistakes) that occurs in packets transmitted in a transmission path are generated when the reception circuit at the reception end fails to receive correct packets due to a subtle variation in setting values of peak voltages in voltage waveforms output from an analog circuit of the transmission circuit or a subtle difference in timings of output of the voltage waveforms. In this specification, conditions that cause such errors are referred to as failure conditions.

In the failure conditions, i.e. when data transfer temporarily fails, the conventional data transfer method, upon detecting an error in data, discarded the data and requested retransmission of the data. As a result, an error bits that is a failure location in the packets could not be specified. When data transfer operations temporarily fail, it is necessary to find whether the failure is permanent fault or not after restarting the system. However, the failure analysis was rendered difficult because failure conditions may not remain the same after restarting the system.

In view of the above, persons skilled in the art would appreciate the following. When the failure is a temporary failure such as failure in transmission due to permanent fault as a result of fluctuation in the adjustment state of an analog circuit in a transmission circuit or in a reception circuit, from the viewpoint of the communication recovery, the communication is expected to be recovered by readjustment of circuit by reinitializing (restarting) the transmission circuit and the reception circuit. Meanwhile, from the view point of identifying the failed part, there is a problem that the failure analysis becomes difficult since the failure state cannot be reproduced by the reinitialization of the circuit.

[Patent Document 1]
Japanese Laid-open Patent Publication No. 64-834
[Patent Document 2]
Japanese Laid-open Patent Publication No. 63-318838

SUMMARY

According to an aspect of the invention, an apparatus has a data transmission device for transmitting data and a data reception device for receiving via a transmission path data transmitted by a data transfer apparatus other than the data transmission device. The data transmission device includes a data generation unit for receiving an input of transmission target data and for generating transmission data that is the transmission target data with error testing information added; a data recording unit for recording the transmission data generated in the data generation unit; a data transmission unit for transmitting the transmission data generated by the data generation unit to the other data transfer apparatus; and a retransmission control unit for causing the data transmission unit to transmit the transmission data recorded by the data recording unit to the other data transfer apparatus when a retransmission request of the transmission data transmitted by the data transmission unit is received. And the data reception device includes a data reception unit for receiving the transmission data transmitted by the other data transfer apparatus as received data; an error testing unit for testing the received data by using the error testing information added to the received data and when an error occurs, for transmitting a retransmission request of the received data in which the error occurred to the other data transfer apparatus; an error data recording unit for recording error reception data having the error detected by the error testing unit; and a failure position identifying unit for comparing the transmission data recorded in the data recording unit with error reception data recorded in the error data recording unit and for identifying a failure position.

The object and advantages of the invention will be realized and attained by means of the elements and combinations particularly pointed out in the claims.

It is to be understood that both the foregoing general description and the following detailed description are exemplary and a explanatory and are not restrictive of the invention, as claimed.

BRIEF DESCRIPTION OF DRAWINGS

FIG. 4 illustrates a configuration of the data transfer apparatus of the present embodiment;

FIG. 5A illustrates a data transmission system arranged at the transmission end or at the reception end of the data transfer apparatus of the present embodiment;

FIG. 5B illustrates detailed block diagram of the transmission end A in FIG. 5A.

FIG. 5C illustrates detailed block diagram of the reception end B in FIG. 5A.

FIG. 6 illustrates the format of a packet used in the data transfer apparatus in the present embodiment;

FIG. 7 illustrates packets carried in the transmission system of FIG. 5;

FIG. 8 represents the operation flow of the data transfer apparatus at the transmission end;

FIG. 9 illustrates an example of a configuration of a failure bit identifying circuit;

FIG. 10 represents the operation flow of the data transfer apparatus at the transmission end;

FIG. 11 illustrates an example of a circuit configuration of the transmission unit including the retransmission control unit; and FIG. 12 illustrates an example of circuit configurations of the transmission circuit and the reception circuit.

DESCRIPTION OF EMBODIMENTS

Figure 1:
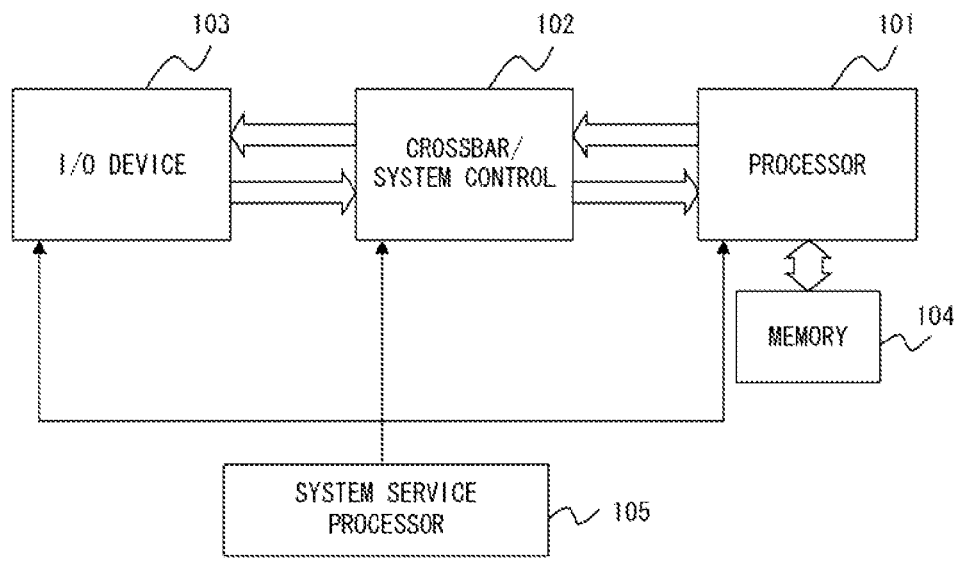
FIG. 1 illustrates a configuration of an information processing apparatus.
Figure 2:
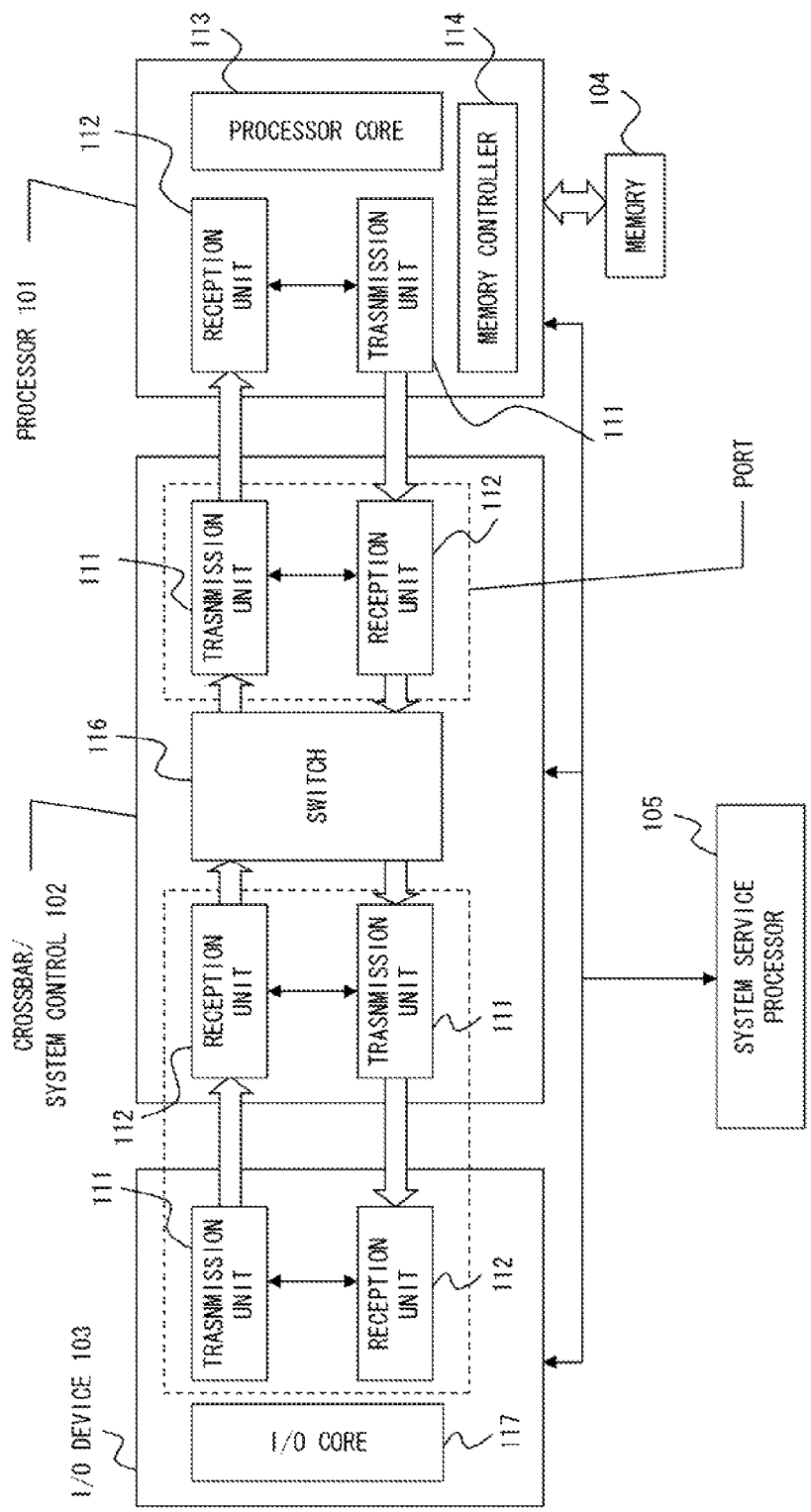
FIG. 2 is a diagram illustrating a detailed configuration of a section relating to the data transfer of the information processing apparatus.

As described previously, a configuration having means for recording of an error packet including an error bit as a log when a temporary failure of retransmission operations occurs, for restarting to recover from the failure state that generates the error packet, and for identifying an error bit from the recorded error packet is sought in the data transfer apparatus. In addition, at the time of restarting a transmission path, a configuration that reduces error occurrence in data transfer by adjusting voltage values or timing relating to the data transmission/reception in the analog circuit of the transmission circuit and the reception circuit is sought. However, a data transfer apparatus with such a configuration did not exist to the present.

The object of the present invention is to provide a data transfer apparatus having functions, when an error packet is received at a reception end, of recording the error packet and identifying the failure position. The object is also to provide a data transfer apparatus having a function of initializing and restarting the data transmission/reception unit to recover from the failure state.

A feature of the data transfer apparatus of the invention is to have functions, in a failure state in which an error packet is received at a reception end, of transmitting the error packet to the transmission end to record, analyzing the error packet and identifying the failure position at the transmission end. Another feature is to initialize and restart the data transmission/reception unit to recover from the failure state.

According to the above features, the data transfer apparatus allows for returning of an error packet received at the reception end to the transmission end and recording of the error packet at the transmission end. The data transfer apparatus also allows for easy and prompt identification of an error bit in order to identify an error bit by comparing an originally transmitted packet with the error packet. In addition, the data transfer apparatus, by recording the error packet at the transmission end, allows for reproduction of the failure state afterwards and analysis of the failure. When the transmission fails due to a temporarily failure state, the apparatus is activated after adjusting analog circuits in the transmission circuit or reception circuits, so that communications can be recovered.

According to the data transfer apparatus disclosed herein, packet transmission fails during a temporary failure state, communication can be recovered by initializing and restarting the transmission path. The error packet received at the reception end is transmitted to the transmission end, and is recorded at the transmission end, and an error bit is identified so that the failure position can be promptly identified. Since the error packet is recorded at the time of failure occurrence, it is useful in the failure analysis in the future.

In the following description, an example of the embodiments of the data transfer apparatus and the data transfer method according to the present invention is explained with reference to the drawings.

Although data transfer in an information processing apparatus is explained in the following embodiments, the present embodiments are not limited to such data transfer but are applicable to any data transfer apparatuses for transmitting/receiving data via transmission paths.

FIG. 4 illustrates a configuration of the data transfer apparatus of the present embodiment.

Figure 3:
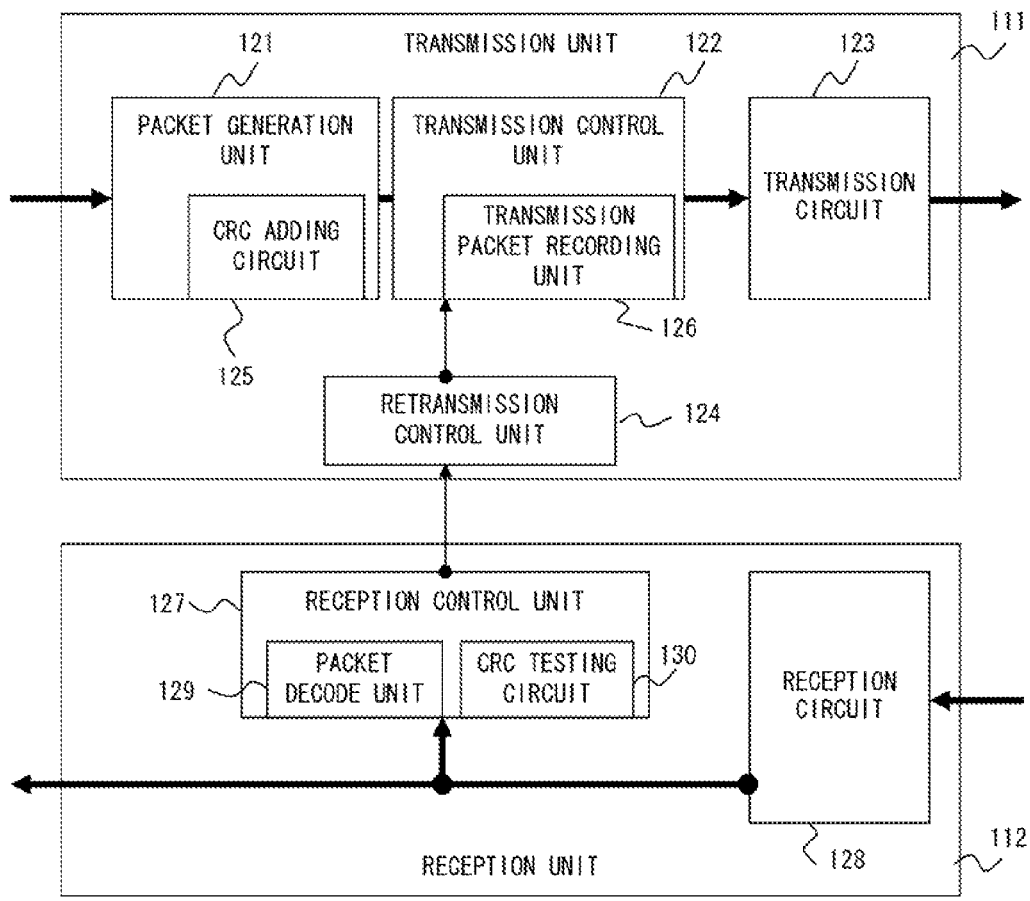
FIG. 3 depicts detailed configurations of the transmission unit and the reception unit.

The data transfer apparatus has a transmission unit 1 and a reception unit 2. Similarly to the configuration of the conventional data transfer apparatus illustrated in FIG. 3, a packet generation unit 3, a transmission control unit 4, a transmission circuit 5, and a retransmission control unit 9 are provided in the transmission unit 1, and a reception control unit 7 and a reception circuit 6 are provided in the reception unit 2. The packet generation unit 3 generates packets from transmission data consisting of commands and data generated in the upper layer. The packet generation unit 3 also has a CRC adding circuit 31 for adding error testing information such as CRC to the transmission data.

The transmission control unit 4 controls the transmission of the generated packets. The transmission control unit 4 has a transmission packet recording unit 41 for recording all transmitted packets in preparation of receiving a request for retransmission from the reception end.

The transmission circuit 5 drives a transmission path and converts a digital signal into a voltage waveform to transmit data.

The reception circuit 6 converts the received voltage waveform into a digital form (0 or 1).

The reception control unit 7 checks the received packets. The reception control unit 7 has a packet decode unit 71 for decoding the received packets and a CRC testing circuit 72 for CRC testing of the received packets.

When the data transfer apparatus is in the reception end, in a case that an error is found in a received packet based on the result of the CRC testing circuit 72 testing the received packets, the retransmission control unit 9 transmits a retransmission request. When the data transfer apparatus is in the reception end, if the received packet is a retransmission request, the retransmission control unit 9 conducts a control to retransmit the transmitted packet from the transmission packet recording unit 41.

Although each of the units in the data transfer apparatus of the present embodiment seems similar to the components of a conventional data transfer apparatus, the data transfer apparatus of the present embodiment further has a failure identifying unit 8 in the reception unit 2.

The failure identifying unit 8 has an error packet recording unit 81 and a failure bit recording unit 82. When a packet transmitted from the reception end is found as an error packet as a result of the decoding in the packet decode unit 71, the error packet recording unit 81 records the error packet returned from the reception end. The failure bit recording unit 82 records an error bit identified by a failure bit identifying circuit (described later) by comparing the transmission packet stored in the transmission packet recording unit 41 in the transmission control unit 4 of the transmission unit 1 with the error packet.

The data transfer apparatus of the present embodiment also has a failure investigation packet for requesting failure investigation when a correct packet cannot be received after the retransmission control unit makes packet retransmission requests for a preset number of times.

Operations of the data transfer apparatus of the present embodiment, which has a constitution illustrated in FIG. 4, are explained on the basis of the system having a transmission end A and a reception end B illustrated in FIG. 5A. In the following description, the embodiment is explained with reference to FIG. 5B and FIG. 5C. FIG. 5B illustrates detailed block diagram of the transmission end A, and FIG. 5C illustrates detailed block diagram of the reception end B.

In FIG. 5B, in the data transfer apparatus at the transmission end A, transmission packets are generated from transmission data consisting of commands and data generated in the upper layer, to which CRC is added in a packet generation unit 3a (a CRC adding circuit 31a).

Next, in a transmission control unit 4a, the transmission packet is recorded in the transmission packet recording unit 41a. In a transmission circuit 5a, a digital signal is converted into a voltage waveform and is transmitted toward the reception end. In the data transfer apparatus at the reception end B (FIG. 5C), the voltage waveform is received and in a reception circuit 6b, the voltage waveform is converted to a digital signal, and the converted digital signal is regarded as received packets.

Next, a CRC testing circuit 72b in the reception control unit 7b tests the received packets, if an error is not detected, the received packet is set to the upper layer as received data. If the CRC testing circuit 72b detects an error (mistake) in the received packet, a retransmission control unit 9b and an error packet recording unit 81b in a failure identifying unit 8b are notified of the error.

The error packet recording unit 81b stores the packet with the detected error upon receiving the notification from the CRC testing circuit 72b.

The retransmission control unit 9b notifies the packet generation unit 3b of transmission of retransmission request packet in response to the notification of reception of an error packet from the CRC testing circuit 72b. In the packet generation unit 3b, a retransmission request packet is generated by adding CRC in the CRC adding circuit 31b. The generated retransmission request packet is transmitted toward the data transfer apparatus at the transmission end A via the transmission control unit 4b and the transmission circuit 5b.

The retransmission control unit 9b, when a correct packet cannot be received after making packet retransmission requests for a preset number of times, transmits an investigation request packet to the transmission end A and the error packet that is the packet in the error packet recording unit 81b reconstructed as an error investigation packet follows the investigation request packet. The retransmission control unit 9b initializes the transmission path (described later) if the initialization mode is set in advance when a correct packet cannot be received after making packet retransmission requests for a preset number of times. Note that the "a preset number of times" is the number of times for retransmission of packets that a system administrator sets via a system service processor 10, and is indicated in FIG. 5A, 5B, 5c as "retransmission number setting" in the transmission unit 1a, 1b.

When the transmission end A receives the packets from the reception end B, first, errors is tested in the CRC testing circuit 72a in the reception control unit 7a, and the packets are decoded in the packet decode unit 71a. Here, if the packets are determined as the retransmission request packets, the retransmission control unit 9a is notified of the retransmission request. The retransmission control unit 9a takes a control so as to transmit transmission packets stored in the transmitted packet recording unit 41a to the reception end B.

If the packets are determined as the investigation request packets as a result of the packet decoding in the packet decode unit 71a, the subsequently received packets are stored in the error packet recording unit 81a in the failure identifying unit 8a as error packets. The failure bit identifying circuit 83b (described later) compares the transmitted packets stored in the transmitted packet recording unit 41a with the error packets stored in the error packet recording unit 81a, and notifies the failure bit recording unit 82a of different bits as failure bits.

The failure bit recording unit 82a stores the test result from the failure bit identifying circuit 83a. The information recorded in the failure bit recording unit 82a is read out by reading means, which is not illustrated in the drawing, and is used in failure analysis in the future.

In the above description, operations of the data transfer apparatus of the present embodiment are explained. The next description explains how the packets are processed with reference to FIG. 6 and FIG. 7.

FIG. 6 illustrates the format of a packet used in the data transfer apparatus in the present embodiment.

The packet input to the transmission circuit 5 or the packet output from the reception circuit 6 is divided into three fields: header; data; and CRC. The header field indicates the type of the packet (type field) and the length of the whole packet (len field). If the len field is longer than 1 (the length of the packet is 2 or longer), the header field is added only to the first cycle. The CRC field is generated from inputs of sections other than the CRC field for every cycle by using a generation function, which is defined in advance, and constitutes a packet together with the header and data.

FIG. 7 illustrates packets carried in the transmission system of FIG. 5A. In FIG. 7 the circled numbers D1-D11 indicate data at each point in FIGS. 5B and 5C.

D1 (FIG. 5B) is transmission data consisting of commands and data generated in the upper layer.

In D2 (FIG. 5B), a header corresponding to the type of the transmission packet is added.

In D3 and D4 (FIG. 5B), a CRC code calculated in D2 is added and a transmission packet is generated. The transmission packet is recorded in the transmission recording unit 41a (D10).

The packet is transmitted by the transmission circuit 5a, and the packet D5 (FIG. 5C) received at the reception end B is tested with the CRC testing and decoded with packet decoding. If an error is detected, the packet is recorded as an error packet (D7 (FIG. 5C)).

If no error is detected, the upper layer is notified of the packet as the received data (D6 (FIG. 5C)).

If an error is detected in the received packet, the retransmission control unit 9b notifies the packet generation unit 3b of generation of a retransmission request packet, and the retransmission request packet is generated and sent to the transmission end A (D8 (FIG. 5C), D9 (FIG. 5B)). In addition, when the retransmission control unit 9b determines that a correct packet cannot be received after making retransmission requests for a preset number of times, an investigation request packet is transmitted to the transmission end A, followed by packets, which are packets stored in the error packet recording unit 81b and reconstructed as error investigation packets (D8 (FIG. 5C), D9 (FIG. 5B)). The error investigation packet is the packet stored in the error packet recording unit 81b and reconstructed by adding a packet header and CRC.

When the transmission end A determines that the retransmission request packet is received, the transmission packet D10 (FIG. 5B) stored in the transmitted packet recording unit 41a is transmitted (D4 (FIG. 5B)).

When the transmission end A determines an investigation request packet is received, the failed bit is identified by taking exclusive OR of the transmission packet D10 (FIG. 5B) and the error packet (D11 (FIG. 5B)) following the investigation request packet.

In the above description, details of the operations of the data transfer apparatus illustrated in FIG. 4 are explained with reference to FIG. 5-FIG. 7. Next, the operation flow when the data transfer apparatus of FIG. 4 is at the transmission end and the operation flow when the data transfer apparatus is at the reception end are explained.

FIG. 8 represents the operation flow of the data transfer apparatus at the transmission end.

In S501, the retransmission control unit 9a in the transmission unit 1a determines whether a retransmission request is received or not from the decoding result of the packet decode unit 71a in the reception control unit 7a.

When the determination result in S501 is that a retransmission request is received (S501: Yes), the process proceeds to S507 to request retransmission of the packet to the transmission control unit 4a. The transmission control unit 4a, upon receiving the packet retransmission request from the retransmission control unit 9a, extracts the retransmission packet form the transmitted packet recording unit 41a in S507, and sends the retransmission packet to the transmission circuit 5a in S508.

When the retransmission request is not received in S501, (S501: No), the process proceeds to S502. In S502, whether an investigation request is received or not is determined from the decoding result of the received packet in the packet decode unit 71a in the reception control unit 7a.

When the determination result in S502 is that an investigation request is not received (S502: No), the packet generation unit 3a in the transmission unit 1a receives a notice indicating that new data transmission processing can be performed, and generates transmission packets corresponding to the new transmission data from the upper layer (S503). After generating a CRC code and adding it to the transmission data in S504, the transmission packet is recorded in the transmitted packet recording unit 41a in S505 and is sent to the transmission circuit 5a in S506. The transmission circuit 5a controls the transmission path in response to the transmission data, and transmits the data to a data reception end port.

When the determination result in S502 is that an investigation request is received (S502: Yes), the process proceeds to S509 to request the transmission of acknowledge packets to the packet generation unit 3a. The packet generation unit 3a generates the acknowledge packets, and after generating a CRC code and adding it to the transmission data, sends the acknowledge packets to the transmission control unit 4a and the transmission circuit 5a as transmission packets.

After the acknowledge packets are transmitted in 509, when the reception control unit 7a detects the reception of an error packet in S510, identification of failure bit is requested to the failure identifying unit 8a. In S511, the failure identifying unit 8a records the received packet in the error packet recording unit 81a as an error packet, and compares the error packet with the transmitted packet stored in the transmitted packet recording unit 41a in the transmission unit 1a. In this manner, the failure bit is identified and recorded in the failure bit recording unit 82a in S512.

Note that an example of a circuit of the failure bit identifying circuit in the failure identifying unit 8a that executes the processing of S511 and S512 is illustrated in FIG. 9. When a reception notice of the error investigation packet is received from the packet decoder 71a, timing adjustment in accordance with the length of the packet and generation of error packet storage address and transmission packet storage address are performed. At the timing when the error packet and the transmission packet are read out, exclusive OR of the error packet and the transmission packet are written in a register. In the present embodiment, both of the error packet and the transmission packet are to be stored in RAM, but the packets can be stored in other suitable storage means such as FF (flip-flop) and register files.

Next, FIG. 10 represents the operation flow of the data transfer apparatus at the transmission end.

In S701, first, the reception circuit 6b receives packets from the transmission path.

In S702, the CRC testing circuit 72b in the reception control unit 7b tests a CRC code added to the received packets.

When no CRC error is confirmed in S702 (S703: No), a counter 1101 in the retransmission control unit 9b for counting the number of times of packet retransmission is cleared, and notifies the upper layer of the reception of packets in S717. Note that an example of a circuit configuration of the transmission unit 1 including the retransmission control unit 9 is illustrated in FIG. 11. As in FIG. 11, in the case of no CRC error, a CRC error signal is inverted and input to a clear control port of the counter 1101 so that the counter 1101 are cleared.

When a CRC error is detected in S702 (S703: Yes), the failure identifying unit 8b is instructed to store the received packet in S704. The reception control unit 7b further determines whether the number of times of the retransmission request is less than the preset number of times or not in S705. In FIG. 11, a prescribed retransmission number and the output value of the counter 1101 are input to a computing unit 1102 (A−B≧0) and an output is obtained.

When the number of the retransmission request is less than a prescribed number in S705, (S705: Yes), the retransmission control unit 9b in the transmission unit 1b is instructed to transmit the retransmission request packet in S706. In FIG. 11, a retransmission request packet transmission instruction is output based on the CRC error signal and an inverted signal of an output of the computing unit (A−B≧0) 1102. In S707, the number of times of the retransmission is increased by 1. In other words, the counter 1101 in FIG. 11 is incremented.

When the number of times of retransmission equals to or more than a prescribed number of times (S705: No) in S705, whether a mode statically set by the system service processor (10 in FIG. 5A) in advance is the mode to reinitialize the transmission path at the time of investigation request transmission or not is determined in S708. This process is performed in a part of circuit drawn in the upper half of FIG. 11 (a part of circuit from an input of a reinitializing mode signal set by the system service processor to an output of a reinitializing instruction signal).

If the mode is not the reinitializing mode in S708 (S708: No), the process proceeds to S710, and the retransmission control unit 9b instructs the transmission of an investigation request packet to the packet generation unit 4b.

If the mode is the reinitializing mode in S708 (S708: Yes), the process proceeds to S709, and the transmission path is reinitialized. After the completion of the reinitialization of the transmission path, the investigation request packet is transmitted in S710.

Here, the initialization of the transmission path means initialization of the transmission circuit 5 and the reception circuit 6. FIG. 12 illustrates an example of circuit configurations of the transmission circuit and the reception circuit.

The initialization of the transmission circuit 5 is performed in the order of adjustment of drive current and drive voltage with a drive current voltage adjuster circuit 1201, adjustment of a terminal resistance with a terminal resistance adjuster circuit 1202, and reset of write/read pointer in a parallel-in-serial-out converter (PISO) 1203.

The initialization of the reception circuit 6 is performed in the order of adjustment of a terminal resistance with a terminal resistance adjuster circuit 1204, adjustment of offset voltage of a receiver with a receiver offset voltage adjuster circuit 1205, relocking processing of a digital locked loop circuit (DLL) 1206, phase adjustment of the received clock with a phase adjuster circuit 1207, reset of write/read pointer in a serial-in-parallel-out converter (SIPO) 1208, and reset of write/read pointer in a FIFO buffer.

Afterwards, the reception circuit 6b receives packets in S711. The CRC code is tested in the CRC testing circuit 72b in the reception control unit 7b in S712.

When a CRC error is detected (s713: Yes), the process returns to S711 and the packet is received once again. When the result of the CRC code testing is normal (S713: No), the packet decode unit 71b determines whether the received packet is an acknowledge packet or not in S714.

When the packet is not an acknowledge packet in S714 (S714: No), the process returns to S711 and the packets are received one again. When the packet is an acknowledge packet in S714 (S714: Yes), the process proceeds to S715, and the retransmission control unit 9b in the transmission unit 1b is instructed to transmit an error packet. The retransmission control unit 9b instructs the transmission control unit 4b to transmit the error packet stored in the error packet recording unit 81b, and the error packet is transmitted via the transmission circuit 5b. This processing is illustrated in FIG. 11 in a part of circuit from an input signal of an investigation response packet reception notice to an output of an error investigation packet transmission instruction signal.

As described above, details of the constitution and operations of the data transfer apparatus according to the present embodiment are explained. The data transfer apparatus of the present embodiment allows for returning of an error packet received at the reception end to the transmission end and recording of the error packet at the transmission end. The data transfer apparatus also allows for easy and prompt identification of a failure position in order to identify an error bit (failure position) by comparing an originally transmitted packet with the error packet. In addition, the data transfer apparatus, by recording the error packet at the transmission end, allows for reproduction of the failure state afterwards and analysis of the failure. After the transmission fails due to a temporarily failure state, the apparatus is activated after adjusting analog circuits in the transmission circuit or reception circuits, so that communications can be restored.

Although details of the data transfer apparatus according to the present embodiment are explained above, the data transfer apparatus and the data transfer control method are not limited but can be adopted in any data apparatus for transmitting and receiving data via transmission paths. The present embodiment merely describes one mode of the data transfer apparatus and data transfer method of the present invention, and various modifications can be made within the scope of the gist of the present embodiment.

All examples and conditional language recited herein are intended for pedagogical purposes to aid the reader in understanding the invention and the concepts contributed by the inventor to furthering the art, and are to be constructed as being without limitation to such specifically recited examples and condition, nor does the organization of such examples in the specification relate to a showing of the superiority and inferiority of the invention. Although the embodiments of the inventions have been described in detail, it should be understood that the various changes, substitutions, and alterations could be made hereto without departing from the spirit and scope of the invention.

What is claimed is:

1. A data transfer apparatus having a data transmission device for transmitting data and a data reception device for receiving via a transmission path data transmitted by a counterpart side data transfer apparatus other than the data transfer apparatus, the data transmission device comprising:
 a data generation unit for receiving an input of transmission target data and for generating transmission data that is the transmission target data with error testing information added;
 a data recording unit for recording the transmission data generated in the data generation unit;
 a data transmission unit for transmitting the transmission data generated by the data generation unit to the counterpart side data transfer apparatus; and
 a retransmission control unit for causing the data transmission unit to transmit the transmission data recorded by the data recording unit to the counterpart side data transfer apparatus when a retransmission request of the transmission data transmitted by the data transmission unit is received, and the data reception device comprising:
 a data reception unit for receiving the transmission data transmitted by the counterpart side data transfer apparatus as received data;
 an error testing unit for testing the received data by using the error testing information added to the received data and when an error occurs, for transmitting a retransmission request of the received data in which the error occurred to the counterpart side data transfer apparatus;
 an error data recording unit for recording error reception data having the error detected by the error testing unit; and
 a failure position identifying unit for comparing the transmission data recorded in the data recording unit with error reception data recorded in the error data recording unit and for identifying a failure position, wherein
 the failure position identifying unit taking exclusive OR of a transmission packet recorded in the data recording unit and an error packet recorded in the error data recording unit and identifies the failure position.

2. The data transfer apparatus according to claim 1, wherein
 the data transfer apparatus initializes the data transmission unit when the error testing unit detects an error in the received data corresponding to the transmitted retransmission request after the retransmission control unit transmits the retransmission request a prescribed number of times to the counterpart side data transfer apparatus.

3. The data transfer apparatus according to claim 1, wherein
 the retransmission control unit transmits a failure investigation request for requesting the error reception data recorded in the error data recording unit and failure investigation of the error reception data when the error testing unit detects an error in the received data corresponding to the transmitted retransmission request to the counterpart side data transfer apparatus after the retransmission control unit transmits the retransmission request a prescribed number of times.

4. A data reception device for receiving via a transmission path data transmitted from a data transfer apparatus having a data transmission device for transmitting data, the data reception device comprising:
 a data reception unit for receiving the transmission data transmitted by the data transfer device as received data;
 an error testing unit for testing the received data by using error testing information added to the received data and when an error occurs, for transmitting a retransmission request of the received data in which the error occurred to the data transfer apparatus;

an error data recording unit for recording error reception data having the error detected by the error testing unit; and a failure position identifying unit for comparing the transmission data recorded in a data recording unit of the data transfer apparatus with error reception data recorded in the error data recording unit and for identifying a failure position, wherein the failure position identifying unit taking exclusive OR of a transmission packet recorded in the data recording unit and an error packet recorded in the error data recording unit and identifies the failure position.

5. A control method of a data transfer apparatus having data transmission device for transmitting data and a data reception device for receiving via a transmission path data transmitted by a counterpart side data transfer apparatus other than the data transfer apparatus, the control method comprising:

inputting transmission target data to a data generation unit in the data transmission device;

generating transmission data from the transmission target data by adding error testing information by the data generation unit;

recording, by a data recording unit in the data transmission device, the transmission data generated in the data generation unit;

transmitting, by the data transmission unit in the data transfer apparatus, the transmission data generated in the data generation unit to the counterpart side data transfer apparatus;

causing, by a retransmission control unit in the data transfer apparatus, the data transmission unit to transmit the transmission data recorded in the data recording unit to the counterpart side data transfer apparatus when a retransmission request of the transmission data transmitted by the data transmission unit is received from the counterpart side data transfer apparatus;

receiving, by a data reception unit in the data reception device, the transmission data transmitted from the counterpart side data transfer apparatus as received data;

testing, by an error testing unit in the data reception device, the received data by using the error testing information added to the received data and when an error occurs, and transmitting, by the error testing unit, a retransmission request of the received data in which the error occurred to the counterpart side data transfer apparatus;

recording, by an error data recording unit in the data reception device, error reception data having an error detected in the error testing unit; and comparing, by a failure position identifying unit in the data reception device, the transmission data recorded in the data recording unit with the error reception data recorded in the error data recording unit and identifying, by the failure position identifying unit, a failure position wherein taking, by the failure position identifying unit, exclusive OR of a transmission packet recorded in the data recording unit and an error packet recorded in the error data recording unit and identifies the failure position.

6. The control method according to claim 5, wherein the control method of the data transfer apparatus further comprises initializing, by the retransmission control unit, the data transmission unit when the error testing unit detects an error in the received data corresponding to the transmitted retransmission request after the retransmission control unit transmits the retransmission request a prescribed number of times to the counterpart side data transfer apparatus.

7. The control method according to claim 5, wherein the control method for the data transfer apparatus further comprises transmitting, by the retransmission control unit, a failure investigation request for requesting the error reception data recorded in the error data recording unit and failure investigation of the error reception data when the error testing unit detects an error in the received data corresponding to the transmitted retransmission request to the counterpart side data transfer apparatus after the retransmission control unit transmits the retransmission request a prescribed number of times.

* * * * *